(12) United States Patent
Overby

(10) Patent No.: US 11,472,104 B2
(45) Date of Patent: Oct. 18, 2022

(54) ADDITIVE MANUFACTURING SYSTEM

(71) Applicant: Continuous Composites Inc., Coeur d'Alene, ID (US)

(72) Inventor: Andrew John Overby, Coeur d'Alene, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 29 days.

(21) Appl. No.: 17/249,661

(22) Filed: Mar. 9, 2021

(65) Prior Publication Data

US 2021/0299956 A1  Sep. 30, 2021

Related U.S. Application Data

(60) Provisional application No. 62/993,989, filed on Mar. 24, 2020.

(51) Int. Cl.
| | | |
|---|---|---|
| *B29C 64/236* | (2017.01) | |
| *B29C 64/118* | (2017.01) | |
| *B33Y 30/00* | (2015.01) | |
| *B33Y 10/00* | (2015.01) | |
| *B29C 64/209* | (2017.01) | |
| *B25J 9/02* | (2006.01) | |

(52) U.S. Cl.
CPC .......... *B29C 64/236* (2017.08); *B29C 64/118* (2017.08); *B29C 64/209* (2017.08); *B33Y 10/00* (2014.12); *B33Y 30/00* (2014.12); *B25J 9/026* (2013.01)

(58) Field of Classification Search
CPC ... B29C 64/118; B29C 64/185; B29C 64/209; B29C 64/236; B23C 1/002; B25J 9/026
See application file for complete search history.

(56) References Cited

U.S. PATENT DOCUMENTS

| | | |
|---|---|---|
| 7,070,060 B1 | 7/2006 | Feider et al. |
| 9,108,360 B2 | 8/2015 | Comb et al. |
| 9,592,685 B2 | 3/2017 | Rigio et al. |
| 9,682,576 B2 | 6/2017 | Musete |
| 9,840,090 B2 | 12/2017 | Dupre et al. |

(Continued)

FOREIGN PATENT DOCUMENTS

WO  2020170058 A1  8/2020

OTHER PUBLICATIONS

Bartsch, RepRap Forum: Driving Two Leadscrews With One Stepper Using a Belt, Oct. 25, 2016; <https://reprap.org/forum/read.php?14,717302> (retrieved online on Aug. 9, 2022) (Year: 2016).*

(Continued)

*Primary Examiner* — Joseph S Del Sole
*Assistant Examiner* — Manley L Cummins, IV
(74) *Attorney, Agent, or Firm* — Ryan C. Stockett

(57) ABSTRACT

An additive manufacturing system is disclosed for use in fabricating a structure. The additive manufacturing system may include a print head configured to discharge a material, a first structure, and a second structure. The first structure may be configured to move the print head within a plane during discharge of the material. The second structure may be configured to move the print head within the plane during material discharge, the second structure being movable together with the print head by the first structure.

15 Claims, 4 Drawing Sheets

(56) References Cited

U.S. PATENT DOCUMENTS

| | | | |
|---|---|---|---|
| 9,862,213 B2 | 1/2018 | Rigio et al. | |
| 9,908,290 B1* | 3/2018 | Clayton | B29C 64/227 |
| 10,384,475 B2 | 8/2019 | Roeck et al. | |
| 10,434,719 B2 | 10/2019 | Swanson et al. | |
| 10,513,104 B2 | 12/2019 | Barclay et al. | |
| 2013/0078073 A1 | 3/2013 | Comb et al. | |
| 2015/0130100 A1* | 5/2015 | Fiegener | B29C 64/118 |
| | | | 425/150 |
| 2015/0321419 A1* | 11/2015 | Linthicum | B29C 48/02 |
| | | | 425/375 |
| 2015/0343632 A1* | 12/2015 | Penn | B25J 9/023 |
| | | | 74/490.09 |
| 2016/0039149 A1* | 2/2016 | Cassara | B29C 64/118 |
| | | | 425/150 |
| 2016/0144564 A1* | 5/2016 | Padgett | B29C 64/209 |
| | | | 425/113 |
| 2016/0144569 A1* | 5/2016 | Martin | B29C 64/232 |
| | | | 425/150 |
| 2018/0056608 A1 | 3/2018 | Dunn et al. | |
| 2018/0236713 A1* | 8/2018 | Robert | B29C 64/295 |

OTHER PUBLICATIONS

Wizard, published on Mar. 30, 2015, CNCzone, Forum, Woodworking Machines, DIY CNC Router Table Machine, betls vs. screws. <https://www.cnczone.com/forums/diy-cnc-router-table-machines/55716-cnc.html> (retrieved online on Aug. 9, 2022). (Year: 2015).*

* cited by examiner

ADDITIVE MANUFACTURING SYSTEM

RELATED APPLICATION

This application is based on and claims the benefit of priority from U.S. Provisional Application No. 62/993,989 that was filed on Mar. 24, 2020, the contents of which are expressly incorporated herein by reference.

TECHNICAL FIELD

The present disclosure relates generally to a manufacturing system and, more particularly, to a system for additively manufacturing structures.

BACKGROUND

Additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a three-dimensional shape formed by the stack of two-dimensional layers.

FDM and other traditional forms of additive manufacturing utilize one of several different available motion platforms to move the print head along the tool path during discharge of the material into the two-dimensional layers. One example motion platform utilizes an overhead gantry having leadscrews that extend in a first (e.g., X-) direction and in a second (e.g., Y-) direction. A carriage is mounted to the first-direction leadscrews via one or more threaded bearings, and the second-direction leadscrews extend between the carriage and one or more threaded bearings of the print head. Motors are controlled to selectively rotate the leadscrews, causing the associated bearings to advance the carriage and/or the print head in desired directions, by desired amounts, and/or at desired speeds. An example of this type of motion platform is disclosed in WO2020170058 that was filed Feb. 21, 2019.

Although the leadscrew configuration described above may be adequate for some applications that require high-torque, high-rigidity, a large build volume, and/or high-precision, it may also be problematic. For example, the leadscrew configuration may have high mass, which can require a larger and costlier motor and result in a higher momentum. The high momentum can limit use of the leadscrew configuration at high speeds and/or high accelerations. In addition, chattering is common along leadscrews, which can reduce a quality of printing.

An alternative motion platform also utilizes an overhead gantry. However, this gantry relies on a series of belts and pulleys. For example, U.S. Pat. No. 9,108,360 that issued on Aug. 18, 2015 discloses an arrangement having two stationary motors and two stationary pulleys attached to a frame of a printing system. A carriage is slidably mounted to a Y-axis bearing shaft of the frame and includes sleeves that receive X-axis bearing shafts. A print head is slidably mounted to the X-axis bearing shafts. A belt passes around driveshafts of the motors, the two stationary pulleys, and four additional pulleys mounted to the carriage. Ends of the belt terminate at a mount of the print head. The motors can be independently or simultaneously driven in the same or opposing directions to move the print head in an X-Y plane along only the X-direction, only the Y-direction, or both the X- and Y-directions (e.g., diagonally). Consumables are stationarily mounted to the frame.

Although the belt-driven motion platform described above may be a lower cost improvement in applications that require high-speeds and/or high-accelerations, it may also be problematic. For example, the belt may stretch during operation, thereby losing rigidity and limiting its use to smaller build volumes (e.g., where the belt is shorter) and lighter print heads.

The disclosed system is directed to addressing these and other issues of the prior art.

SUMMARY

In one aspect, the present disclosure is directed to an additive manufacturing system. The additive manufacturing system may include a print head configured to discharge a material, a first structure, and a second structure. The first structure may be configured to move the print head within a plane during discharge of the material. The second structure may be configured to move the print head within the plane during material discharge, the second structure being movable together with the print head by the first structure.

In another aspect, the present disclosure is directed to method of moving a print head of an additive manufacturing system during material discharge from the print head. The method may include moving the print head within a plane via a first structure. The method may also include moving the print head and the first structure within the plane via a second structure.

DETAILED DESCRIPTION

Figure 1:
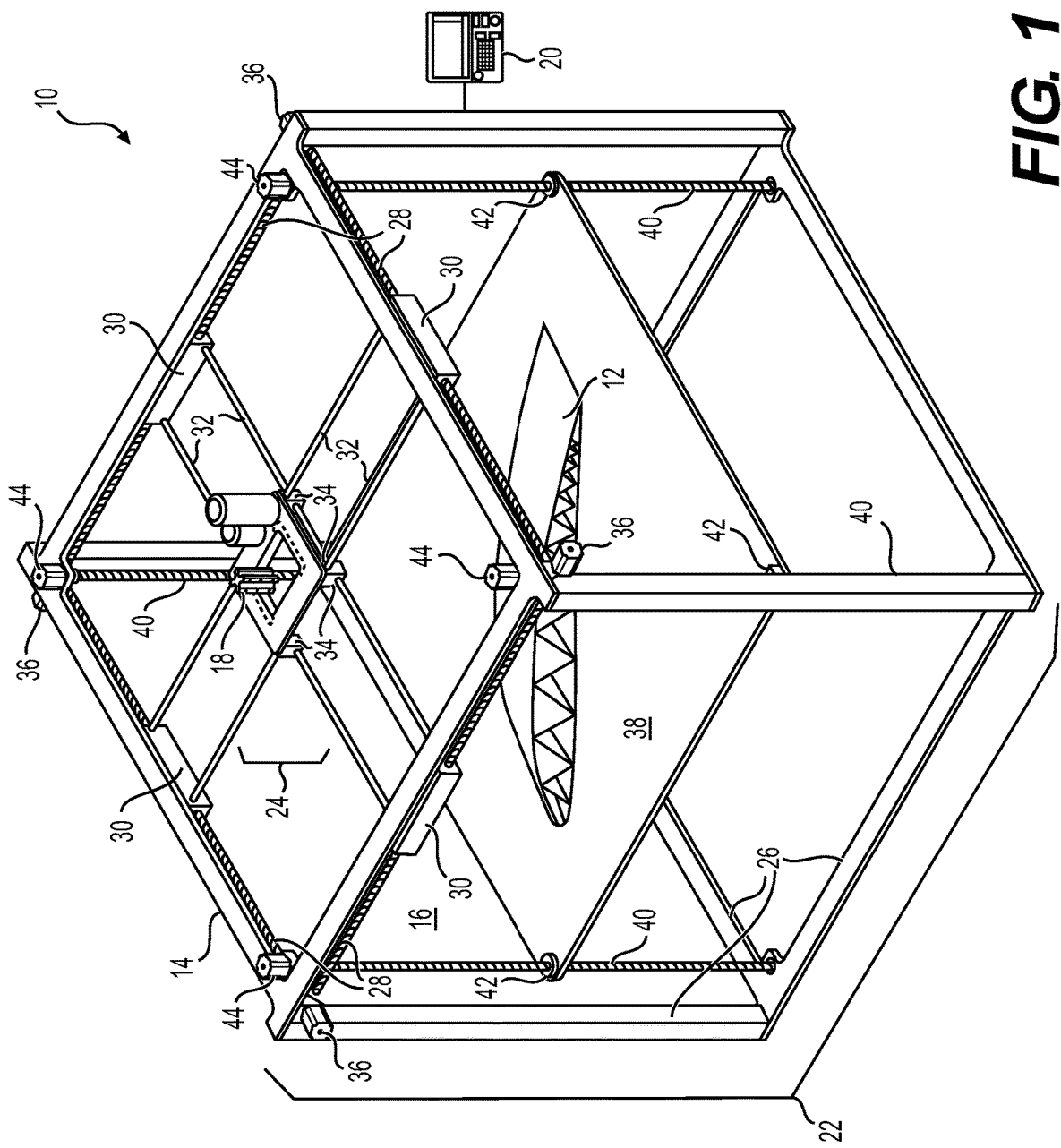
FIG. 1 is a diagrammatic illustration of an exemplary disclosed additive manufacturing system.

FIG. 1 illustrates an exemplary system 10, which may be used to manufacture a structure 12 having any desired shape. System 10 may include a support 14 forming a build volume ("volume") 16, and a print head ("head") 18 mounted to and moved by support 14 to deposit material within volume 16 under the guidance and regulation of a controller 20.

Support 12 may include a first or outer motion structure 22 and a second or inner motion structure 24 that is at least partially nested within and moveable relative to first structure 22. First structure 22 may be configured to move second structure 24 and head 18 together with greater stability over longer distances due to its high mass, while second structure 24 may be configured to move print head 18 with a high-response rate due to its lower mass. The combined features of both structures 22, 24 may allow support 14 to have both high-stability and high-response rate, resulting in greater accuracies and faster build times within a larger build volume 16.

As shown in FIG. 1, first structure 22 may include a generally multi-sided skeletal, solid, or semi-solid frame 26, wherein second structure 24 is positioned at an outer face (e.g., an upper most face, relative to the pull of gravity) of frame 26. In one embodiment, frame 26 is generally rectangular, having six faces. In other embodiments, however, frame 26 could be pyramidal, cylindrical, or have another polyhedron shape with any number of faces.

First structure 22 may additionally include, among other things, one or more lead screws 28 located at the outer face of frame 26, one or more threaded blocks 30 operatively mounted on each of lead screw(s) 28, and one or more slide rails or shafts 32 that extend between blocks 30 and corresponding bearings 34 of second structure 24. In the depicted embodiment, four lead screws 28 are illustrated as being located around a perimeter of the outer face, with one block 30 mounted to each lead screw 28. Two rails 32 are supported by each block 30, and one bearing 34 connects each rail 32 to second structure 24. It is contemplated, however, that rails 32 could instead be located around the perimeter of the outer face, and lead screws 28 could extend from blocks 30 through bearings 34, if desired. One or more rotary actuators (e.g., electric motors) 36 may be connected to lead screws 28 and configured to generate rotations thereof that cause blocks 30 to translate along the lengths of lead screws 28.

In one embodiment, lead screws 28, blocks 30, and rails 32 may produce movements of head 18 within only the same motion plane afforded by second structure 24 (e.g., within only the X-Y plane). In another embodiment (not shown), the upper face of structure 12 could additionally be moveable in a direction orthogonal to the X-Y plane (e.g., in a Z-direction), for example via additional lead screws, threaded blocks, and rotary actuators. In either embodiment, the motion of head 18 within the plane due to actuators 36 may be limited to an area of the upper face. In one example, the motion area of the upper face may be 10-20 times a motion area within second structure 24.

In addition to first structure 22 facilitating motion of print head 18 within the X-Y plane, first structure 22 may additionally facilitate motion of a print platform ("platform") 38 on which material from head 18 is being deposited. One or more lead screws 40 may extend along members of frame 26 in a direction generally orthogonal to the upper face of first structure 22, and platform 38 may be operatively connected to lead screws 40 via one or more bearings 42 (e.g., one bearing located at each corner of platform 38). One or more rotary actuators (e.g., electric motors) 44 may be associated with lead screws 40 and configured to selectively rotate lead screws 40 to cause platform 38 to rise and lower relative to the upper face of frame 26. It is contemplated that the upper face of frame 26 could alternatively or additionally rise and lower relative to platform 38 (See FIG. 4), if desired.

Figure 2:
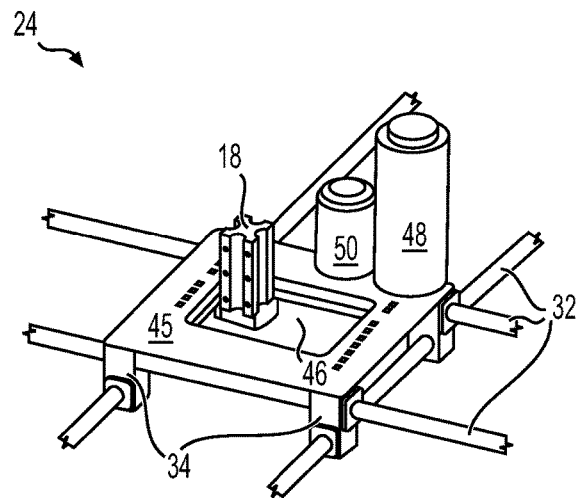
FIGS. 2 and 3 are enlarged diagrammatic illustrations of a portion of the system of FIG. 1.

As shown in FIG. 2, second structure 24 may embody a light-weight belt-driven gantry that includes, among other things, a generally rectangular (e.g., square) carriage 45 connected to first structure 22 via bearings 34 (e.g., four or more bearings 34, at least one located on each corner; six or more bearings 34, two located at each corner and one for each rail 32; etc.). Carriage 45 may include a central opening 46, through which at least a portion (e.g., an outlet) of head 18 may extend. One or more supplies of consumable materials (e.g., a fiber supply 48 and a matrix supply 50) may be rigidly connected to carriage 45 (e.g., at a perimeter of opening 46) and both be in material communication with head 18. With this configuration, the consumable materials may be moved together with head 18 by first structure 22. It is contemplated that additional support modules of system 10 (e.g., LED emitters or other cure sources, cutting mechanisms, compactors, etc.) could be mounted to carriage 45, if desired.

Figure 3:
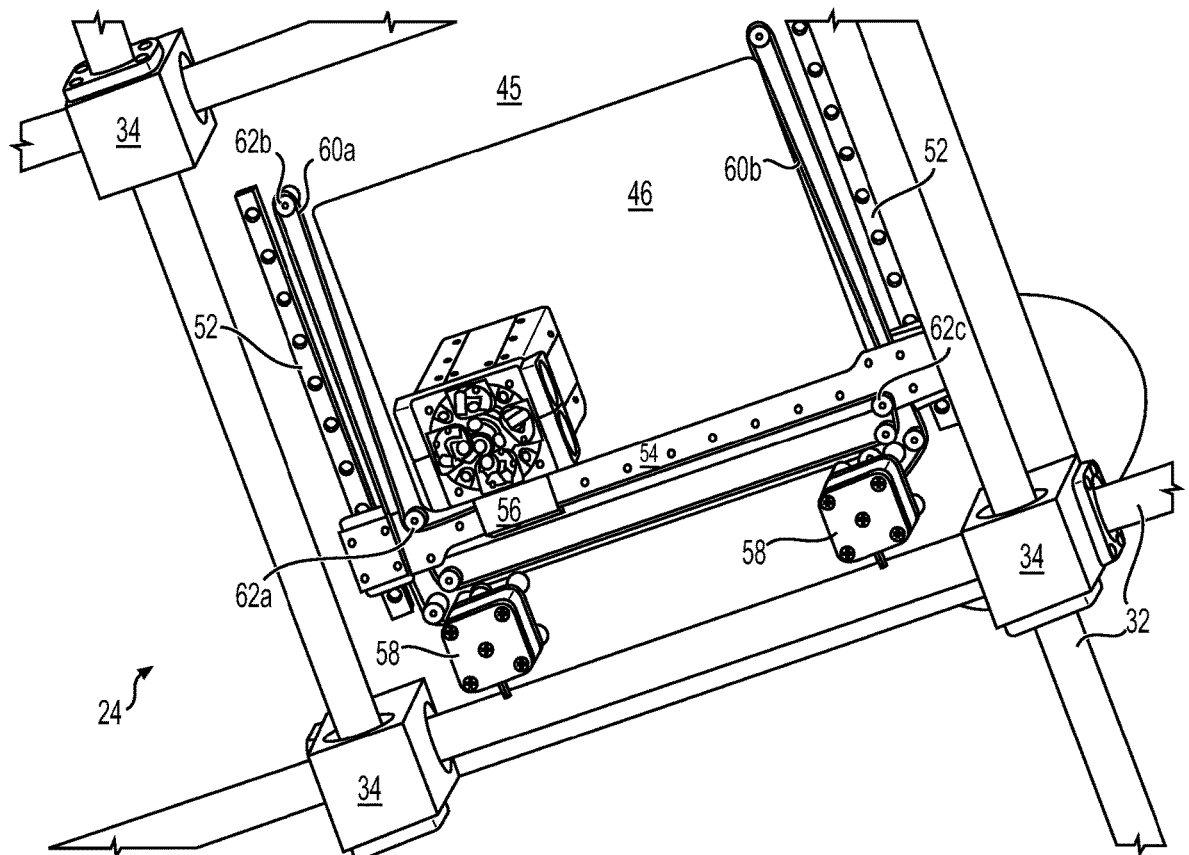

As shown in FIG. 3, one or more guide rails 52 may be rigidly mounted to a side (e.g., a lower side adjacent platform 38) of carriage 45 and configured to support rolling and/or sliding motion of one or more tracks 54. For example, two guide rails 52 are shown as being located at opposing edges of central opening 46, and a single track 54 between guide rails 52 to slide axially along the lengths of rails 52. An adapter 56 may operatively connect head 18 to track 54 and allow head 18 to slide axially along a length of track 54, in the direction orthogonal to rails 52.

One or more (e.g., two) actuators (e.g., electric motors) 58 may be rigidly mounted to carriage 45 and configured to drive the sliding motion of track 54 along guide rails 52 and/or to drive the sliding motion of adapter 56 and head 18 along track 54 via one or more belts 60 and pulleys 62. (e.g., via rolling, sliding, and/or air bearings—not shown). As will be explained in more detail below, actuators 58 may be operated independently, simultaneously, in the same direction, and/or in opposite directions to cause independent or simultaneous motion of head 18 along track 54 (e.g., in the X-direction) and/or along guide rails 52 (e.g., in the Y-direction).

In the specific example of FIG. 3, a first belt 60a is located at the lower side of track 54 and extends from a left (i.e., relative to the perspective of FIG. 3) side of adapter 56 around a first pulley 62a that is affixed to a left end of track 54, around a second pulley 62b that is affixed to carriage 45 at a side of opening 46 opposite actuators 58, back through the left actuator 58, around a third pully 62c that is affixed to a right end of track 54, and back to a right side of adapter 56. A second belt 60b is located at an upper side of track 54 and extends in a similar, but reverse, direction around stationary and moving pulleys 62 located at the right side of carriage 45 and through the right actuator 58. It should be noted that additional stationary and/or moving pulleys 62 may be used to direct belts 60 through and/or around actuators 58, if desired. It is noted that other belt/pulley/actuator configurations known in the art may be similarly applied to carriage 45 and track 54 to cause desired motions of print head 18.

In the example embodiment of FIGS. 1-3, first structure 22 may allow movements of head 18 in only a single (i.e., the X-Y) plane. Head 18 may not be moved by first structure 22 in a direction orthogonal to the plane. The motion of head 18 generated by first structure 22 may be limited to a space within the upper face. Second structure 24 may similarly allow movements of head 18 only within the X-Y plane. Motion of head 18 within the X-Y plane due to second structure 24 may be limited to an area of opening 46.

It is contemplated that the motion of head 18 within opening 46 of second structure 24 due to actuators 58 may be sequential to or simultaneous with the motion of head 18 within the same plane due to actuators 36 of First structure 22. For example, actuator(s) 36 may facilitate slower and larger movements of print head 18 to a particular region of structure 12 (referring to FIG. 1), while actuators 58 may facilitate quicker and smaller movements during material discharge within the particular region. Alternatively, actuators 36 may coordinate the slower larger movements with the quicker smaller movement of actuators 58 during material discharge.

Figure 4:
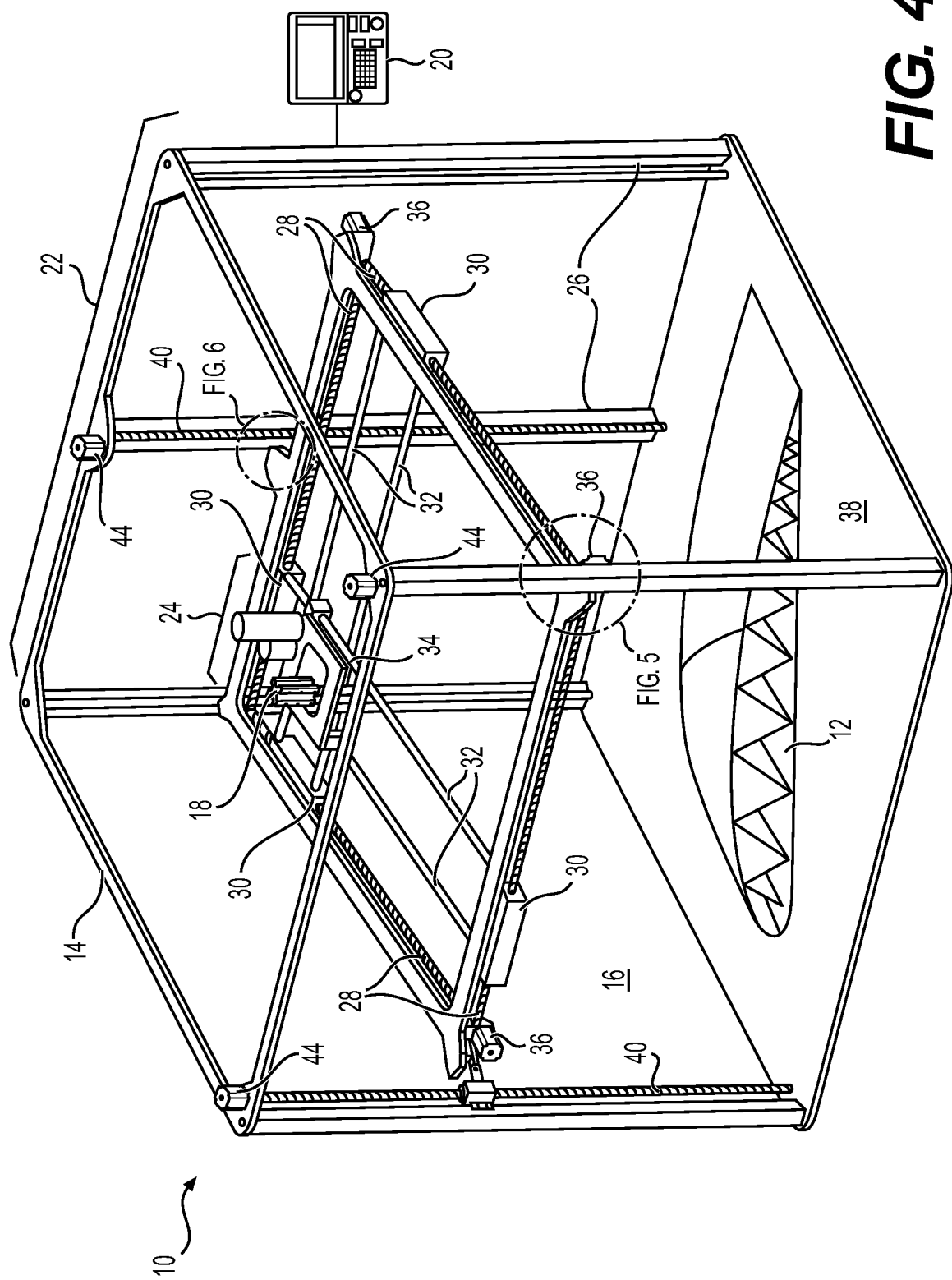
FIG. 4 is a diagrammatic illustration of another exemplary disclosed additive manufacturing system.
Figure 5:
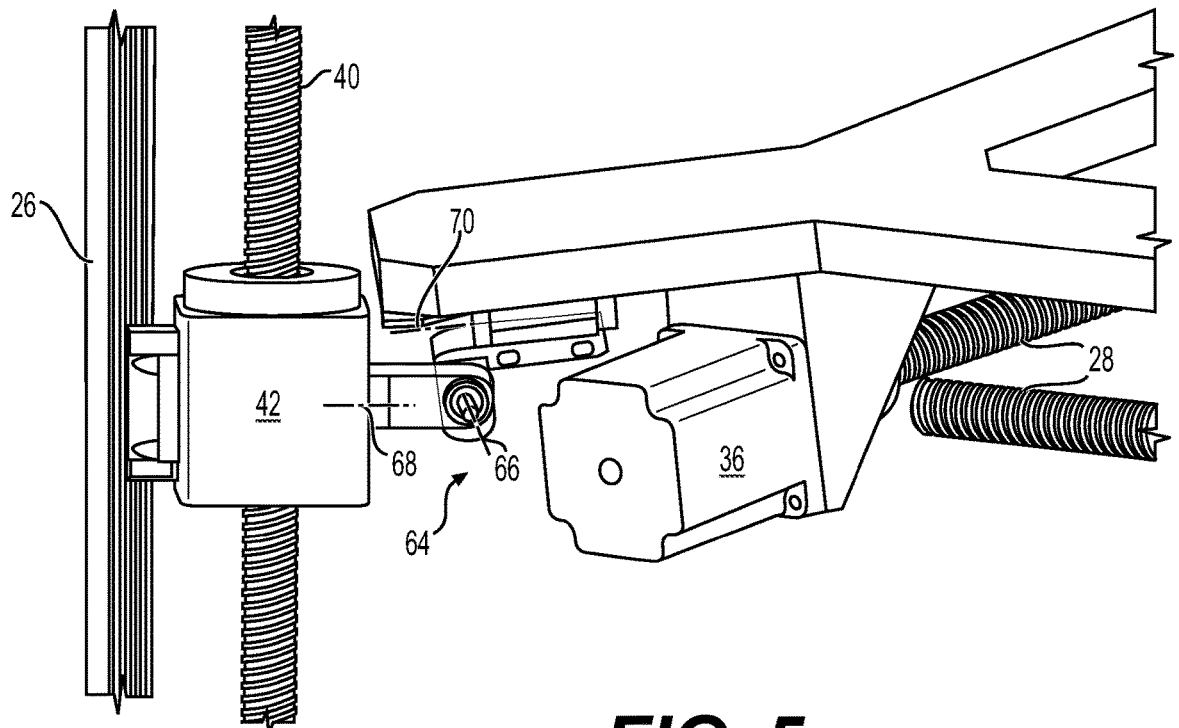
FIGS. 5 and 6 are enlarged diagrammatic illustrations of a portion of the system of FIG. 4.
Figure 6:
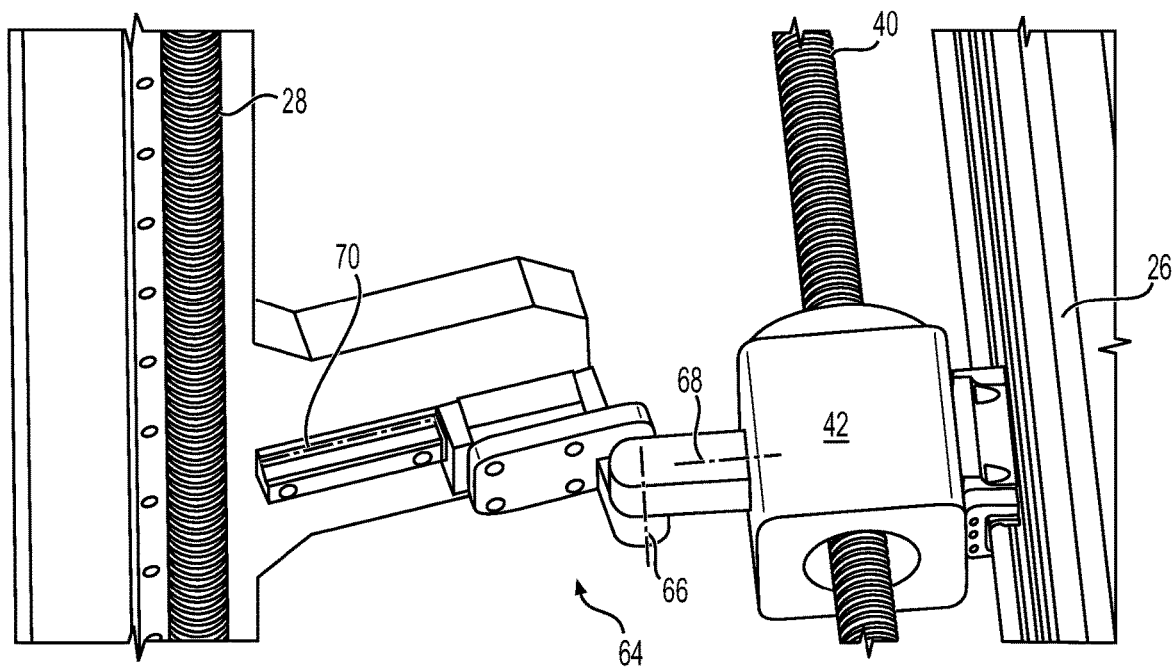

FIGS. 4, 5 and 6 illustrate another embodiment of support 12 that is similar to support 12 of FIGS. 1-3. Like the embodiment of FIGS. 1-3, support 12 of FIGS. 4-6 may include second structure 24 that is at least partially nested within and moveable relative to first structure 22, and print platform 38. However, in contrast to the embodiment of FIGS. 1-3, platform 38 of FIGS. 3-6 may be stationary relative to frame 26, and both first and second structures 22, 24 may be moveable along lead screws 40 towards and away from print platform 38.

In one example, first and second structures 22, 24 are moveable along only three lead screws 40 that are spaced at ends of a triangle (e.g., an isosceles triangle). With this configuration, print platform 38 may be capable of supporting heavier structures 12 in a more stable manner due to its stationary nature. Controller 20 (referring to FIG. 1) may be configured to selectively energize one or more actuators 44 to raise and lower one or more of bearing blocks 42, causing first and second structures 22, 24 to elevate and/or tilt relative to platform 38.

As shown in FIGS. 5 and 6, in order to accommodate independent motion of bearing blocks 42 and the associated tilting of first and second structures 22, 24, bearing blocks 42 may be operatively connected to frame 26 via a joint 64 having multiple degrees of freedom. In the disclosed example, each bearing block 42 may allow movement of first and second structures 22, 24 along a first rotational axis 66, a second rotational axis 68 that is oriented generally orthogonal to first rotational axis 66, and a third translational axis 70. It is contemplated, however, that first and second structures 22, 24 could move along a different number and/or different configurations of axes, if desired.

Controller 20 may be provided and communicatively coupled with support 12 and head 18 of each of FIGS. 1-6. Each controller 20 may embody a single processor or multiple processors that are programmed and/or otherwise configured to control an operation of system 10. Controller 20 may include one or more general or special purpose processors or microprocessors. Controller 20 may further include or be associated with a memory for storing data such as, for example, design limits, performance characteristics, operational instructions, tool paths, and corresponding parameters of each component of system 10. Various other known circuits may be associated with controller 20, including power supply circuitry, signal-conditioning circuitry, solenoid driver circuitry, communication circuitry, and other appropriate circuitry. Moreover, controller 20 may be capable of communicating with other components of system 10 via wired and/or wireless transmission.

One or more maps may be stored within the memory of controller 20 and used during fabrication of structure 12. Each of these maps may include a collection of data in the form of lookup tables, graphs, and/or equations. In the disclosed embodiment, the maps may be used by controller 20 to determine movements of head 18 required to produce desired geometry (e.g., size, shape, material composition, performance parameters, and/or contour) of structure 12, and to regulate operation of cure enhancer(s) 18 and/or other related components in coordination with the movements. As will be explained in more detail below, these movements may be split between first and second structures 22, 24 to achieve a desired size, shape, contour, and resolution of structure 12 within a desired time period of operation.

FIG. 7 illustrates exemplary operations of system 10 that can be regulated by controller 20 based on the maps. FIG. 7 will be discussed in more detail in the following section to further illustrate the disclosed concepts.

INDUSTRIAL APPLICABILITY

The disclosed system may be used to manufacture structures having any desired cross-sectional shape, size, contour and resolution. The disclosed system may manufacture these structures within a reduced window of operational time. High resolution and low operational time may be achieved by optimally splitting motion of head 18 and/or platform 38 between first and second structures 22, 24 and/or by reducing a momentum of the system. Operation of system 10 will now be described in detail.

At a start of a manufacturing event, information regarding a desired structure 12 may be loaded into system 10 (e.g., into controller 20 that is responsible for regulating operations of support 12 and/or head 18). This information may include, among other things, a size (e.g., diameter, wall thickness, length, etc.), a contour (e.g., a trajectories, surface normal, etc.), surface features (e.g., ridge size, location, thickness, length; flange size, location, thickness, length; etc.), connection geometry (e.g., locations and sizes of couplings, tees, splices, etc.), reinforcement selection, matrix selection, discharge locations, severing locations, motion specifications, etc. It should be noted that this information may alternatively or additionally be loaded into system 10 at different times and/or continuously during the manufacturing event, if desired. Based on the component information, one or more different reinforcements and/or matrix materials may be installed and/or continuously supplied into system 10. This may include, for example, mounting of the fiber supply 48 and/or matrix supply 50 onto second structure 24, such that head 18 moves with these materials during activation of first structure 24 and independent of these materials during activation of second structure 22.

After materials are loaded into system 10 and communicated with head 18, controller 20 may selectively cause head 18 to discharge material during activation of one or both of first and second structures 22, 24. It is contemplated that first structure 22 may be activated alone, that second structure 24 may be activated alone, and/or that first and second structures 22, 24 may activated together in a coordinated manner. For example, first structure 22 may be activated to cause motion of second structure 24 in only an X-direction, in only a Y-direction, or in both X- and Y-directions (diagonally). Similarly, second structure 24 may be activated to cause motion of head 18 in only the X-direction, in only the Y-direction, or in both the X- and Y-directions. Finally, any combination of these motions (e.g., X-, Y-, or diagonal motion of second structure 24 in conjunction with X-, Y-, or diagonal motion of head 18, in any combination of positive or negative directions) may be simultaneously imparted via activation of both first and second structures 22, 24.

Positive and negative X-, Y-, and diagonal motions of first structure 22 may be achieved by selectively activating only X-aligned actuators 36, only Y-aligned actuators 36, or both X- and Y-aligned actuators 36 in the same or different rotational directions. Likewise, positive and negative X-, Y-, and diagonal motions of head 18 may be achieved by selectively activating only one or both of actuators 58 in the same or different rotational directions. Any of the motion of first and/or second structures 22, 24 within the X-Y plane may also be selectively coordinated with motion of second structure 24 and head 18 in the Z-direction, tilting of second structure 24 and head 18, and/or motion of platform 38 in the Z-direction.

Examples of how first and second structures 22, 24 may be used together or alone during fabrication of particular geometry are provided. In a first example, a circle having a small radius may be fabricated by system 10. In this example, fabrication of the circle may require high-acceleration. The circle may be fabricated utilizing only structure 24 to move print head 18, which may have the appropriate structure to handle the high-accelerations and still accurately produce features of the circle. In a second example, a straight line may be fabricated by system 10. In this example, fabrication of the straight line may be fabricated utilizing only structure 22 to move print head 18, as changes in acceleration are not present and the rigidity of the leadscrew configuration may improve accuracies. In a third example, a sinusoidal pattern may be fabricated by system 10. In this example, structure 24 may be used to generate the amplitudes of the pattern (i.e., to move head 18 back and forth across a centerline), while structure 22 may be used to generate the periods (i.e., to move head 18 along a length of the centerline). This may result in a fastest fabrication time with a greatest accuracy.

The disclosed system has many advantages over the prior art. For example, the smaller, belt driven gantry being housed inside of the larger lead screw gantry allows for a lower mass at the print head. The mass of the print head is reduced even more by moving material supplies normally residing on the print head to a location off of the print head and on the belt driven gantry. In addition, other components that are critical to the functionality of the print head can also be placed on the smaller gantry, thereby further reducing a mass of the print head.

The lower mass of the print head facilitates quick changes in acceleration, while still allowing for a large build volume otherwise not possible via conventional motion systems. The lead screw gantry provides stable movement of the smaller belt driven gantry to different areas of the print volume, while the belt driven gantry allows for higher print speeds and greater accuracy. Belt stretch, backlash, and chatter may all be reduced.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. An additive manufacturing system, comprising:
  a print head configured to discharge a material;
  a supply capable of supplying the material to the printhead;
  a lead screw gantry configured to move the print head along an X-axis, along a Y-axis, and within an X-Y plane during discharge of the material; and
  a belt driven gantry configured to move the print head along the X-axis, along the Y-axis, and within the X-Y plane, the belt driven gantry being movable together with the print head by the lead screw gantry.

2. The additive manufacturing system of claim 1, wherein the supply is mounted to the belt driven gantry and the belt driven gantry is configured to move the print head relative to the supply of the material.

3. The additive manufacturing system of claim 1, wherein the lead screw gantry is configured to move the print head in a first direction, a second direction, and a diagonal direction between the first and second directions.

4. The additive manufacturing system of claim 3, wherein the belt driven gantry is configured to move the print head in the first direction, the second direction, and the diagonal direction.

5. The additive manufacturing system of claim 1, wherein the belt driven gantry is configured to move the print head with a higher acceleration than the lead screw gantry.

6. The additive manufacturing system of claim 1, wherein a mass moved by belt driven gantry is lower than a mass moved by the lead screw gantry.

7. The additive manufacturing system of claim 1, wherein a motion area of the belt driven gantry is less than a motion area of the lead screw gantry.

8. The additive manufacturing system of claim 1, wherein a motion area of the lead screw gantry is 10-20 times a motion area of the belt driven gantry.

9. The additive manufacturing system of claim 1, wherein:
  the print head is configured to discharge the material onto a build platform; and
  the lead screw gantry is further configured to selectively move the build platform relative to the print head in a direction orthogonal to the X-Y plane.

10. The additive manufacturing system of claim 1, wherein:
  the print head is configured to discharge the material onto a build platform; and
  the lead screw gantry is further configured to selectively move the print head relative to the build platform in a direction orthogonal to the X-Y plane.

11. The additive manufacturing system of claim 10, wherein the lead screw gantry is further configured to selectively tilt the print head relative to the build platform.

12. The additive manufacturing system of claim 11, further including a frame, wherein a face of the frame is mounted to a remaining portion of the frame via a bearing that slides along the remaining portion of the frame and is configured to receive a lead screw of the lead screw gantry.

13. The additive manufacturing system of claim 12, wherein the bearing connects to the face of the frame via a pivoting joint.

14. The additive manufacturing system of claim 13, wherein the pivoting joint includes multiple degrees of freedom.

15. The additive manufacturing system of claim 14, wherein the multiple degrees of freedom include at least one translating axis and at least one rotating axis.

* * * * *